(12) United States Patent
Poitras

(10) Patent No.: US 10,614,380 B2
(45) Date of Patent: Apr. 7, 2020

(54) DYNAMICALLY ADJUSTING SYSTEM METRIC THRESHOLDS BASED ON USER SPECIFIED SYSTEM PERFORMANCE FEEDBACK

(71) Applicant: Nutanix, Inc., San Jose, CA (US)

(72) Inventor: Steven-Tyler Lawrence Poitras, Los Gatos, CA (US)

(73) Assignee: NUTANIX, INC., San Jose, CA (US)

( * ) Notice: Subject to any disclaimer, the term of this patent is extended or adjusted under 35 U.S.C. 154(b) by 847 days.

(21) Appl. No.: 15/293,050

(22) Filed: Oct. 13, 2016

(65) Prior Publication Data

US 2020/0034746 A1 Jan. 30, 2020

(51) Int. Cl.
*G06N 20/00* (2019.01)
*G06F 11/34* (2006.01)

(52) U.S. Cl.
CPC ......... *G06N 20/00* (2019.01); *G06F 11/3409* (2013.01)

(58) Field of Classification Search
CPC .................................................. G06N 20/00
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |
| 2018/0039908 A1* | 2/2018 | Wang ...................... G06N 5/045 |
| 2019/0356533 A1* | 11/2019 | Vasseur ................... H04L 43/08 |
| 2019/0391897 A1* | 12/2019 | Vijendra ................ G06N 20/00 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Stanley K. Hill
(74) *Attorney, Agent, or Firm* — Foley & Lardner LLP

(57) ABSTRACT

Systems for autonomous management of hyperconverged distributed computing and storage systems. A method embodiment commences upon receiving a set of system measurements that correspond to system metrics associated with the computing system. A user interface is presented to users to capture a set of user sentiment indications. Over a period of time, a time series of system measurements and a time series of user sentiment indications are captured and used to form a learning model that comprises dynamically-changing user sentiment correlations between the system measurements and the user sentiment. At some moment in time, a system metric threshold breach event occurs. The learning model is consulted to determine a tracking value between the set of user sentiment indications and the system metric pertaining to the system metric threshold. Based on the tracking value, the respective system metric threshold is adjusted to more closely track with the historical user sentiment indications.

26 Claims, 12 Drawing Sheets

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, Ignacio, et al. "Curator: Self-Managing Storage for Enterprise Clusters" (Mar. 27, 2017), from https://www.usenix.org/conference/nsdi17/.

* cited by examiner

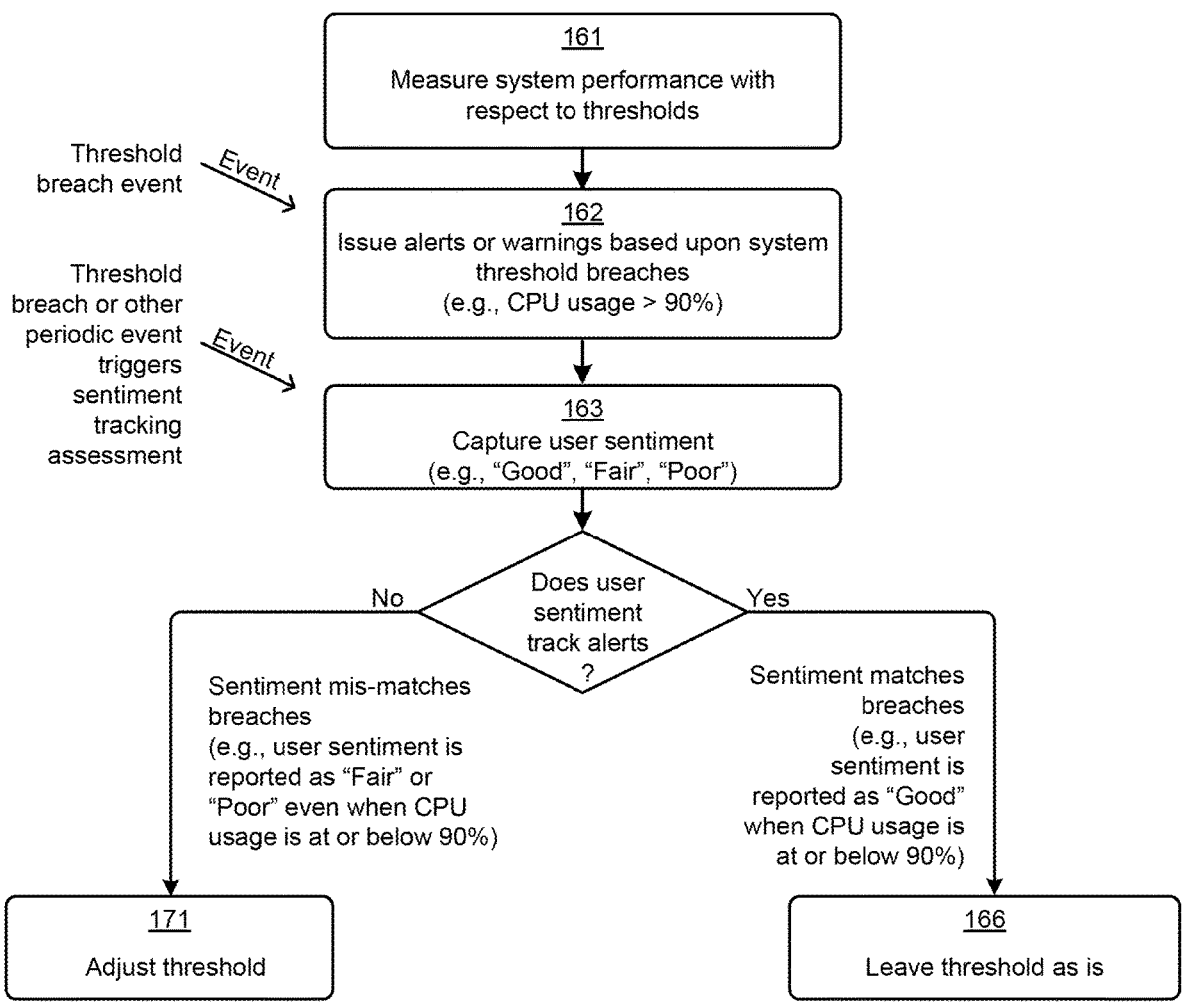
FIG. 1A1

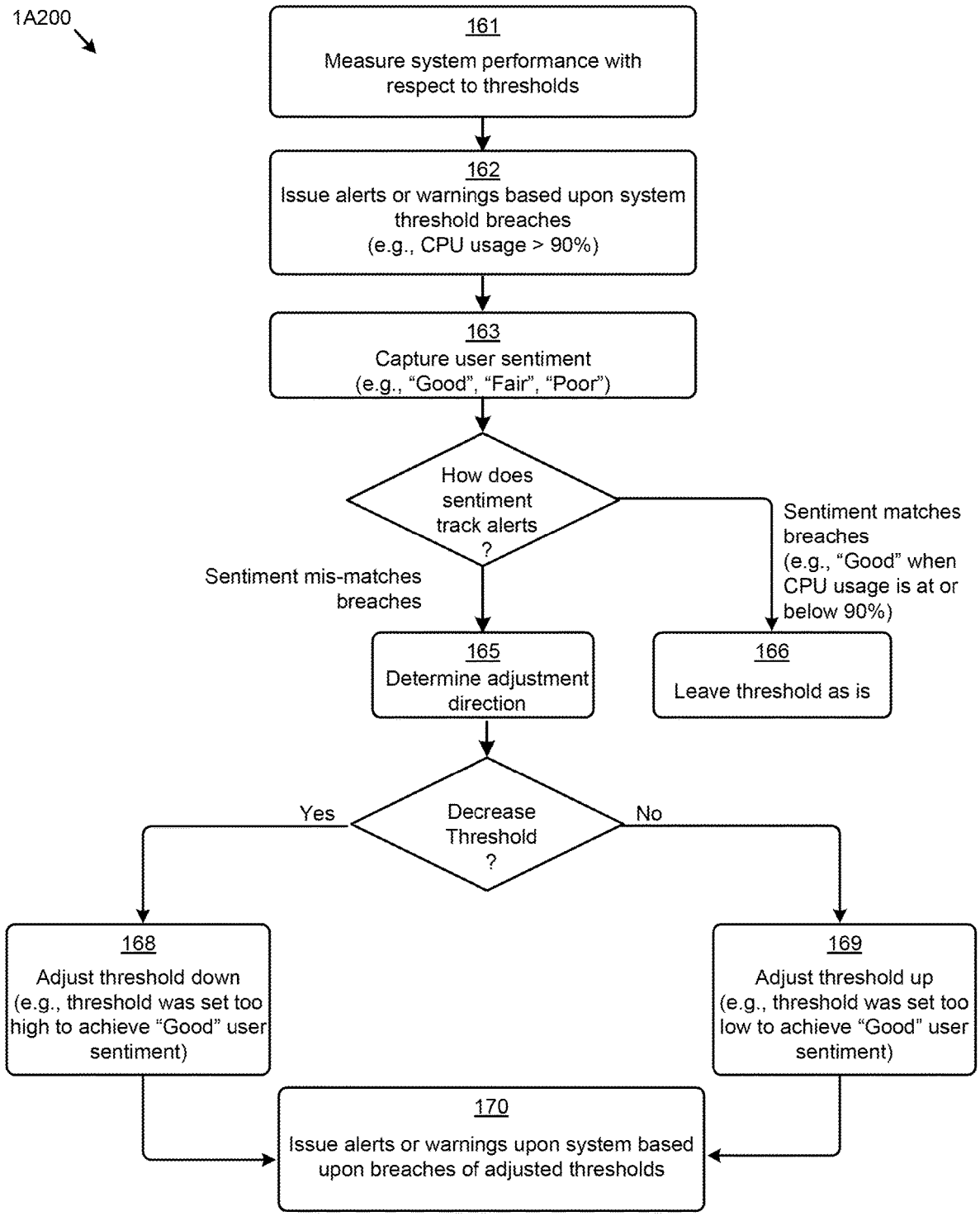
FIG. 1A2

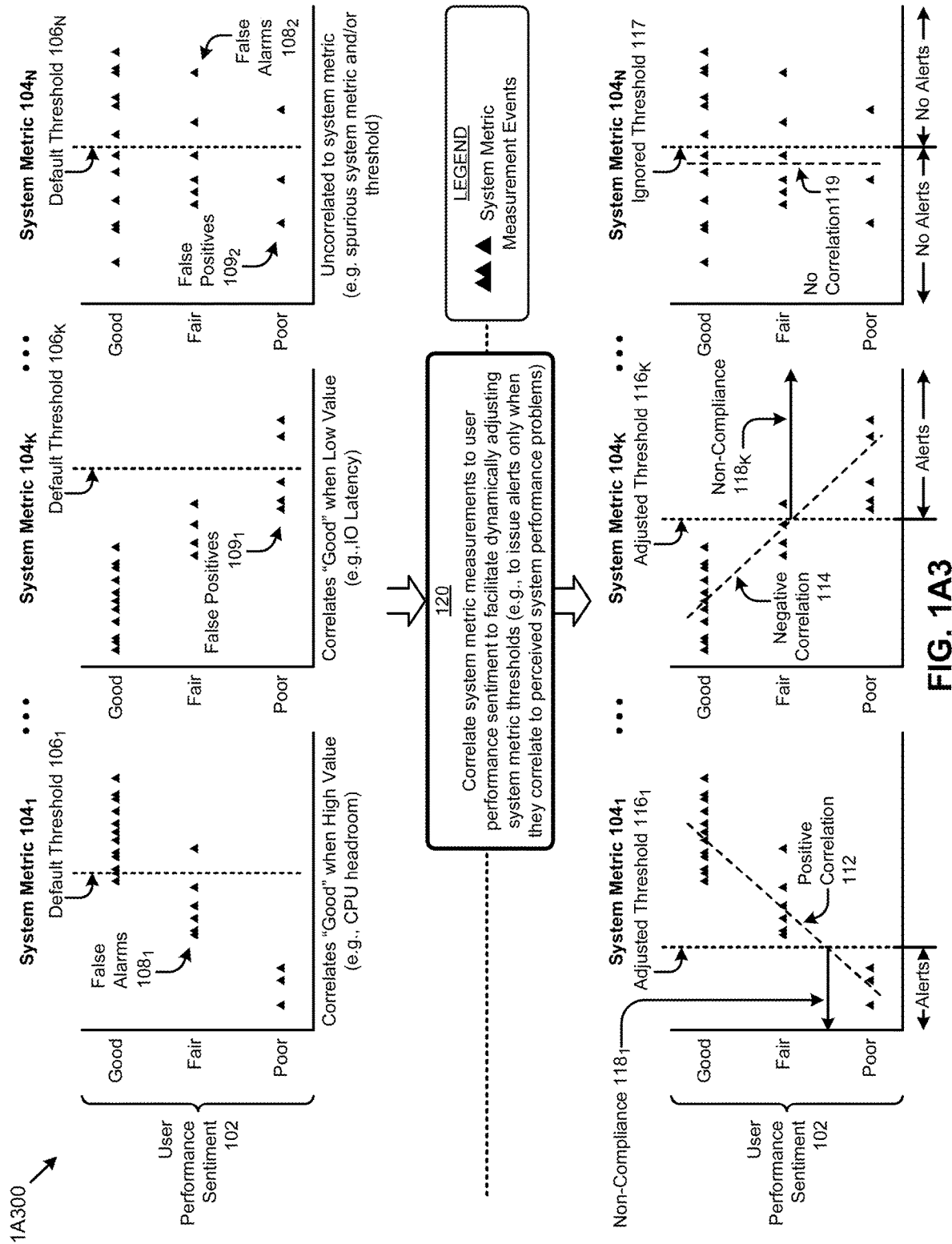
FIG. 1A3

DYNAMICALLY ADJUSTING SYSTEM METRIC THRESHOLDS BASED ON USER SPECIFIED SYSTEM PERFORMANCE FEEDBACK

FIELD

This disclosure relates to autonomous management of converged distributed computing and storage systems, and more particularly to techniques for dynamically setting system metric thresholds based on user specified performance feedback.

BACKGROUND

The use of virtualized environments in distributed computing systems to improve the utilization of computing resources continues to increase. For example, virtual machines (VMs) and/or application containers (ACs) can be implemented in full virtualization environments and/or operating system virtualization environments, respectively, in the distributed computing environments. The high storage I/O demand of VMs and ACs has precipitated an increase in deployment of distributed storage systems. Modern hyperconverged distributed systems (e.g., combining distributed computing and distributed storage) have evolved to comprise autonomous nodes that facilitate incremental and/or linear scaling. In some cases, the distributed systems comprise numerous nodes supporting multiple user VMs and ACs running a broad variety of applications, tasks, and/or processes. For example, with as many as several thousands of autonomous VMs per cluster, the storage I/O activity in a distributed system can be highly dynamic. Providers of such large scale, highly dynamic distributed systems have implemented certain metrics to characterize the behavior of the systems. For example, the system behavior can be monitored by collecting periodic measurements for the metrics. In some cases, the metrics can be used as an indication of system performance. Thresholds might also be established for the metrics which, when breached, can trigger various alerts and/or actions pertaining to the corresponding metric. For example, when a threshold related to storage I/O activity is breached, an alert recommending an increase in storage I/O capacity (e.g., adding more nodes) might be issued.

Unfortunately, legacy techniques for establishing metric thresholds present limitations, at least in their ability to determine system metric thresholds that correlate to the system performance as perceived by the user. Specifically, certain legacy approaches merely set the thresholds of certain system metrics based on default values specified by the providers of the distributed systems. Such default thresholds do not account for the particular dynamic user environment (e.g., applications, workloads, etc.) implemented in the distributed system. For example, a default threshold might underestimate the perceived performance in one user environment and overestimate the perceived performance in another user environment. In another example, a default threshold might trigger multiple alerts that are ignored by a user since the user is satisfied with the system performance. As yet another example, a default threshold might not be breached even though the user is not satisfied with the system performance. Certain approaches might allow a user to set the thresholds for certain detailed system metrics (e.g., CPU utilization, storage access latency, etc.). However, many users may not understand the relationship between the metrics and perceived performance (if any), resulting in user specified thresholds that might be ineffective (or deleterious) as to improving perceived performance. In the foregoing and other legacy approaches, certain actions might also be taken based on observations that are statistically unreliable and/or uncorrelated. For example, a threshold breach at one moment in time may precipitate an action, such as adding a node to a cluster, yet the mere occurrence of such a breach might not have a statistically significant correlation to improving the user's perception of the cluster performance, thus resulting in an expense without corresponding system improvements.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for dynamically setting system metric thresholds based on user specified performance feedback, which techniques advance the relevant technologies to address technological issues with legacy approaches. More specifically, the present disclosure provides a detailed description of techniques used in systems, methods, and in computer program products for dynamically setting system metric thresholds based on user specified performance feedback. Certain embodiments are directed to technological solutions for correlating system metrics to user specified performance indicators to facilitate dynamically adjusting system metric thresholds.

The disclosed embodiments modify and improve over legacy approaches. In particular, the herein-disclosed techniques provide technical solutions that address the technical problems attendant to determining system metric thresholds that correlate to the system performance perceived by the user. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of hyperconverged distributed computing as well as advances in various technical fields related to human-machine interfaces.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A1, FIG. 1A2 and FIG. 1A3 illustrate threshold adjustment techniques as implemented in systems for dynamically setting system metric thresholds based on user specified performance feedback, according to an embodiment.

FIG. 2 depicts a setting in which embodiments of the present disclosure can operate.

DETAILED DESCRIPTION

Figure 1B:
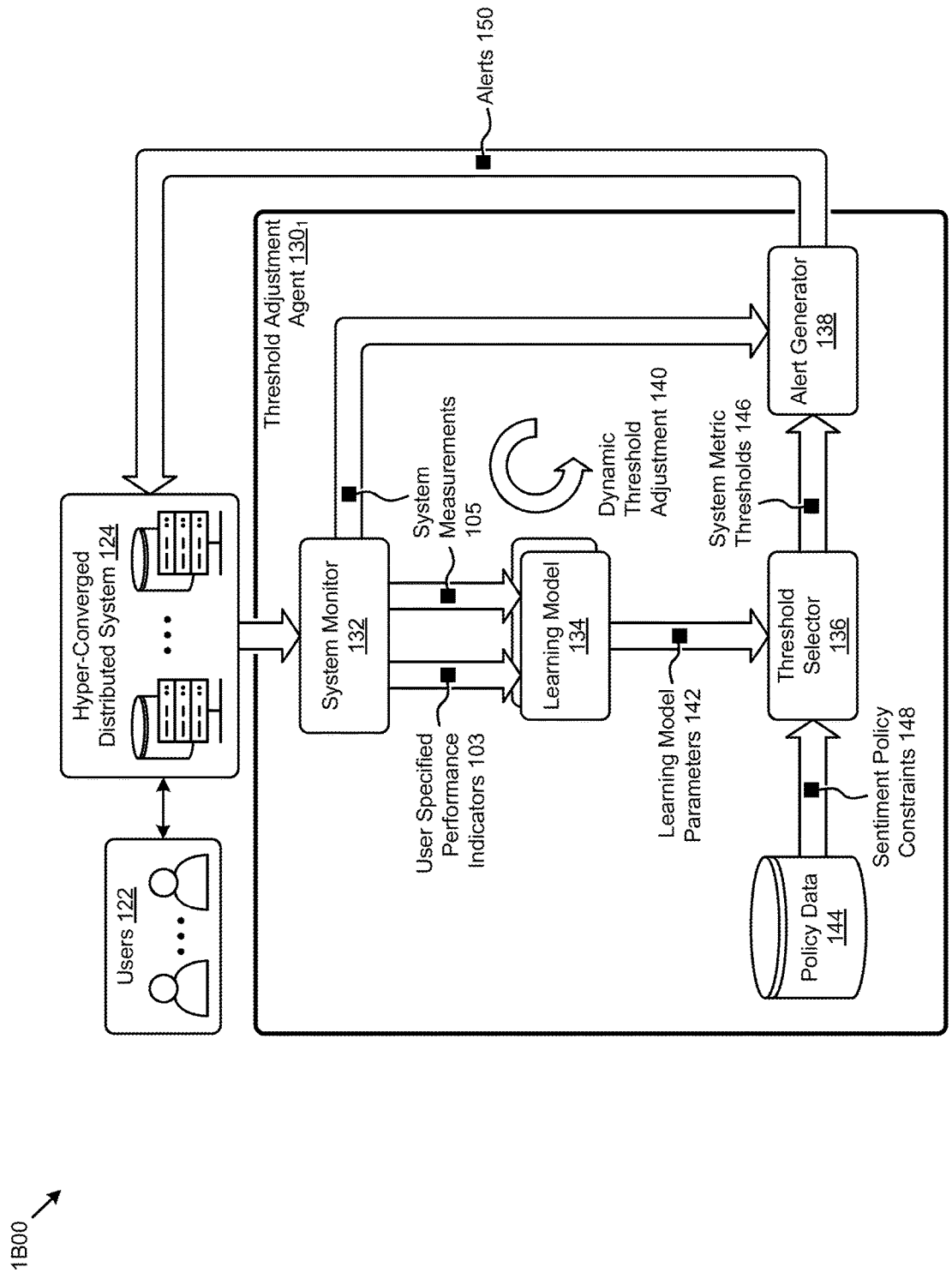
FIG. 1B depicts implementation techniques as used in systems for dynamically setting system metric thresholds based on user specified performance feedback, according to an embodiment.

Some embodiments of the present disclosure address the problem of determining system metric thresholds that correlate to the system performance perceived by the user and some embodiments are directed to approaches for correlating system metrics to user specified performance indicators to facilitate dynamically adjusting system metric thresholds. The accompanying figures and discussions herein present example environments, systems, methods, and computer program products for dynamically setting system metric thresholds based on user specified performance feedback.

Overview

Disclosed herein are techniques for correlating system metrics to user specified performance indicators to facilitate dynamically adjusting system metric thresholds in hyperconverged distributed systems. In certain embodiments, learning model techniques can be implemented to determine correlations between system metric measurements and indicators of user performance sentiment (e.g., user specified performance indicators). The learning models can be used to generate a mapping function to map certain sentiment policy constraints (e.g., when to emit an alert) to a set of system metric thresholds for the system metrics. The resulting system metric thresholds can facilitate detection of policy non-compliance specified in the sentiment policy constraints. Specifically, detecting a threshold breach can indicate non-compliance associated with one or more of the sentiment policy constraints. In certain embodiments, alerts can be generated responsive to a threshold breach. In some embodiments, recommended actions can be associated with the alerts. In other embodiments, a sentiment policy settings form and/or a user sentiment indication form can be presented to various users to facilitate collection of the sentiment policy constraints and/or the user specified performance indicators, respectively.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1 illustrates a threshold adjustment technique 1A100 as implemented in systems for dynamically setting system metric thresholds based on user specified performance feedback. As an option, one or more variations of threshold adjustment technique 1A100 or any aspect thereof may be implemented in the context of the architecture and functionality of the embodiments described herein. The threshold adjustment technique 1A100 or any aspect thereof may be implemented in any environment.

System performance metrics (e.g., CPU utilization metrics, storage IO metrics, network IO metrics, etc.) are captured over time (at step 161) and compared to a corresponding threshold (e.g., "Is average CPU utilization greater than a threshold value of 90%"). If the threshold is breached, an event occurs (as shown), and alerts or warnings are issued (at step 162) such that a user or administrator can take action. The aforementioned event might be the specific event of the breach, or it might be some other periodically-occurring event such as a daily sentiment check event, or a weekly sentiment check event, or the event might occur when a particular number of alerts and/or a particular severity of alerts has been reached.

Based on the aspect that a system metric threshold had been breached, a user interface is provided to the user or administrator so that the user or administrator can indicate (at step 163) a sentiment pertaining to the behavior of the system (e.g., "Good", "Fair", "Poor"). If the indicated sentiment tracks the alerts or breaches (e.g., constant or frequent breaches are occurring when the user deems the system performance as "Poor") then the threshold is left as its then-current value (at step 166). However, if the indicated sentiment does not track the alerts or breaches (e.g., constant or frequent breaches are occurring even when the user deems the system performance as "Good") then the threshold is considered for adjustment (at step 171). In various cases, depending on the semantics of the threshold, the wording of the alerts or warnings, and/or the nature of the presentation in the aforementioned user interface, the adjustment to the threshold might be either up or down. Techniques for determining an upwards or downwards adjustment are shown and discussed as pertaining to FIG. 1A2.

The aforementioned tracking derives from a quantitative tracking value that measures the correlation of a plurality of user sentiment indications to a plurality of corresponding system measurements.

Figure 2:
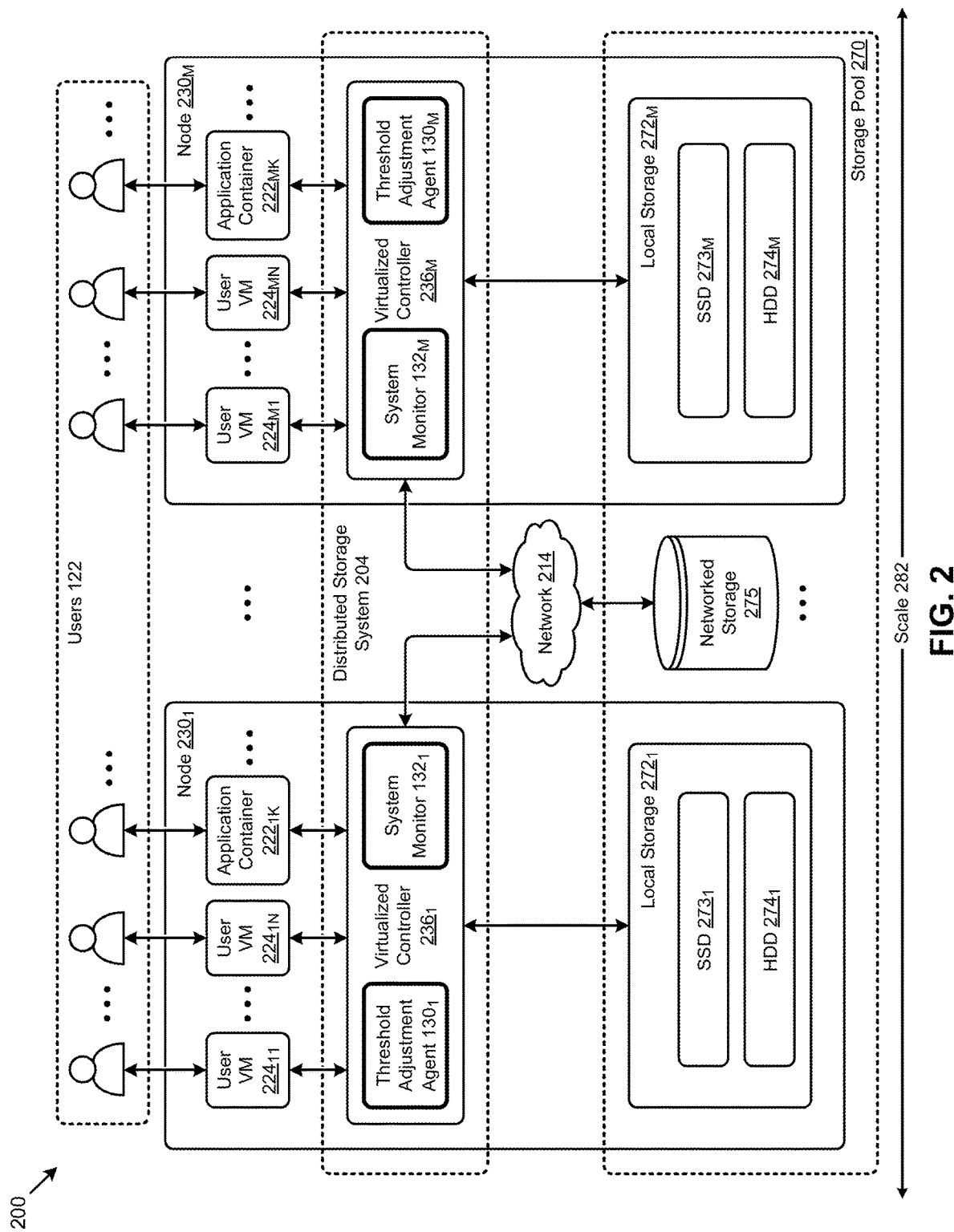

FIG. 1A2 illustrates a threshold adjustment technique 1A200 as implemented in systems for dynamically setting system metric thresholds based on user specified performance feedback. As an option, one or more variations of threshold adjustment technique 1A200 or any aspect thereof may be implemented in the context of the architecture and functionality of the embodiments described herein. The threshold adjustment technique 1A200 or any aspect thereof may be implemented in any environment.

As shown and discussed as pertains to FIG. 1A1, system performance metrics are captured over time (at step 161) and compared to a corresponding threshold. If the threshold is breached, alerts or warnings are issued (at step 162). Based on an event and/or specific aspect determined when a system metric threshold has been breached, a user interface is provided to the user or administrator so that the user or administrator can indicate (at step 163) a sentiment pertaining to the behavior of the system (e.g., "Good", "Fair", "Poor"). If the indicated sentiment tracks the alerts or breaches (e.g., occurrence of constant or frequent breaches are deemed by the user as "Poor" system performance) then the threshold is left as its then-current value (at step 166). However, if the indicated sentiment tracks does not track the alerts or breaches, such as when the occurrence of constant or frequent breaches are deemed by the user as pertaining to "Good" system performance and/or when the user indicates "Poor" performance even when there are few or no breaches pertaining to a respective threshold, then the threshold is considered for adjustment. The direction (e.g., up or down, increase or decrease) of the threshold is based on the nature of the alerts or breaches (determined at step 165) and the direction to adjust so as to improve user sentiment pertaining to the system behavior. In some cases the threshold is adjusted down (at step 168). For example, if the user had indicated "Poor" when the 90% CPU utilization was constant or frequently breached, then the CPU utilization threshold can be adjusted down (e.g., to 80%). In some cases the threshold is adjusted up (at step 169). For example, if the user had indicated "Good" even when the 90% CPU utilization was constant or frequently breached, then the CPU utilization threshold can be adjusted up. Thenceforth, the system will issue alerts based on breaches of the adjusted thresholds (at step 170).

FIG. 1A3 illustrates a threshold adjustment technique 1A300 as implemented in systems for dynamically setting system metric thresholds based on user specified performance feedback. As an option, one or more variations of threshold adjustment technique 1A300 or any aspect thereof may be implemented in the context of the architecture and functionality of the embodiments described herein. The threshold adjustment technique 1A300 or any aspect thereof may be implemented in any environment.

The threshold adjustment technique 1A300 shown in FIG. 1A3 presents sets of measurements for various metrics (e.g., system metric $104_1$, . . . , system metric $104_K$, . . . , system metric $104_N$) pertaining to a distributed system that are grouped by an association with a user performance sentiment 102 (e.g., "Good", "Fair", or "Poor"). For example, a certain group of measurements for system metric $104_1$ (e.g., CPU utilization) can be associated with a user perception of good performance, while another group of measurement for system metric $104_1$ can be associated with a user perception of fair performance, while yet another group of measurements for system metric $104_1$ can be associated with a user perception of poor performance. Measurement groupings associated with user performance sentiment can also be implemented for other metrics (e.g., storage access latency, etc.) such as system metric $104_K$ and system metric $104_N$. Further, the context of user performance sentiment 102 can vary. For example, user performance sentiment 102 can pertain to a perceived speed performance, a perceived response performance, a perceived availability performance, and/or other performance context.

As shown, implementing default metric thresholds to differentiate between acceptable and non-acceptable performance can present limitations. Specifically, such default thresholds might not account for the particular dynamic user environment (e.g., applications, workloads, etc.) implemented in the distributed system. As an example, a default threshold $106_1$ established for system metric $104_1$ might be used to trigger certain alerts when system measurements for that metric are below the threshold. In cases when fair performance is acceptable (e.g., according to certain policies), default threshold $106_1$ can precipitate a set of false alarms $108_1$. In other cases, for example, default threshold $106_K$ established for system metric $104_K$ might result in a set of false positives $109_1$. Specifically, when poor performance is unacceptable, alerts based at least in part on default threshold $106_K$ may not capture all poor performance scenarios. In another example, a default threshold $106_N$ for system metric $104_N$ might precipitate false alarms $108_2$ and false positives $109_2$.

The herein disclosed techniques can address the foregoing problems attendant to default thresholds and/or other problems attendant to determining system metric thresholds that correlate to the system performance perceived by the user by, at least in part, correlating system metrics to user performance sentiment to facilitate dynamically adjusting system metric thresholds (at operation 120). Specifically, the herein disclosed techniques can derive a positive correlation between system metric $104_1$ and user performance sentiment 102. Further, a negative correlation between system metric $104_K$ and user performance sentiment 102 can be determined. In some cases, such as for system metric $104_N$, no correlation might be discovered between the system metric and the user performance sentiment 102. Using such correlations and/or other information pertaining to the herein disclosed techniques, the system metric thresholds can be adjusted to accurately differentiate between acceptable and non-acceptable performance as perceived by the collection of users of the distributed system. For example, an adjusted threshold $116_1$ might be generated by the herein disclosed techniques for system metric $104_1$. As shown, adjusted threshold $116_1$ can accurately represent a non-compliance $118_1$ with a performance policy that does not accept poor performance for users. Further, adjusted threshold $116_K$ can accurately represent a non-compliance $118_K$ with a performance policy that also does not accept poor performance for users. When there is no correlation (e.g., no correlation) between a given system metric and the user performance sentiment, the threshold for that system metric (e.g., ignored threshold 117) might be ignored such that no alerts are issued based on that system metric.

One implementation of various system components and/or interactions for facilitating the foregoing threshold adjustment technique and/or other herein disclosed techniques is shown and described as pertaining to FIG. 1B.

FIG. 1B depicts implementation techniques 1B00 as used in systems for dynamically setting system metric thresholds based on user specified performance feedback. As an option, one or more variations of implementation techniques 1B00 or any aspect thereof may be implemented in the context of the architecture and functionality of the embodiments described herein. The implementation techniques 1B00 or any aspect thereof may be implemented in any environment.

As shown in FIG. 1B, a threshold adjustment agent $130_1$ can interact with various components in a hyperconverged distributed system 124 used by multiple users (e.g., users 122) to implement the herein disclosed techniques. Specifically, the threshold adjustment agent $130_1$ might receive certain information (e.g., data records, messages, etc.) from the hyperconverged distributed system at a system monitor 132. Specifically, system monitor 132 might receive a set of system measurements 105 pertaining to various system metrics. The system measurements 105 might be collected on a periodic basis (e.g., monthly, weekly, hourly, etc.) and/or responsive to some event. For example, certain instances of system measurements 105 might be collected in response to receiving one or more instances of user specified performance indicators 103. Such user specified performance indicators can represent various contexts of user performance sentiment. User specified performance indicators 103 might be received by system monitor 132 based at least in part on input from users 122, while system measurements 105 might be received by system monitor 132 based at least in part on certain instrumentation implemented in hyperconverged distributed system 124.

The system measurements 105 and the user specified performance indicators 103 can be used by threshold adjustment agent $130_1$ to form one or more learning models represented by learning model 134. Such learning models can be used to characterize various correlations between the measurements of certain system metrics (e.g., CPU utilization, storage access latency, storage consumption, bandwidth consumption, storage contention, storage I/O activity, etc.) and user specified performance indicators (e.g., good speed performance, fair response performance, poor availability performance, etc.). In some cases, an ensemble of learning models might be used to account for limitations of any one model or algorithm. For example, a given model might have certain favorable attributes, but might be limited in predicting certain seasonalities. With the ensemble of learning models, a selection tournament can be executed to identify the best model for a given environment, historical time range, and/or other model input (e.g., constraint). The learning model 134 shown can represent the selected model from the ensemble of learning models.

A mapping function 142 comprising a set of parameters (e.g., input variables, output variables, equations, equation coefficients, mapping relationships, limits, constraints, etc.) derived from the learning models can be used by a threshold selector 136 to generate user sentiment correlations to a set of system metric thresholds 146. Specifically, system metric thresholds 146 can be selected based at least in part on a set of sentiment policy constraints 148 from policy data 144. Sentiment policy constraints are values that characterize a boundary between compliance and non-compliance with a given policy. For example, a sentiment policy constraint might correspond to a policy that 80% or more of the users are to experience a "good" speed performance at any given moment in time. As another example, another sentiment policy constraint might correspond to a policy that 100% of the users are to experience a "good" availability performance (e.g., resources are available 100% of the time). In such cases, sentiment policy constraints 148 can be exposed to the mapping function 142 at threshold selector 136 to determine the system metric thresholds 146 that can facilitate detection of policy non-compliance. Over time, user sentiment indications can be correlated to system metrics and their measured values and thresholds to form user sentiment correlations, which in turn are used to determine if a threshold adjustment is needed or not.

An alert generator 138 can apply the system metric thresholds 146 to instances of system measurements 105 received from the hyperconverged distributed system to generate a set of alerts 150 to issue to users 122. In such cases, a threshold breach associated with system metric thresholds 146 can indicate a non-compliance corresponding to sentiment policy constraints 148. In some situations the set of alerts may induce user action such as to acknowledge the alert and/or pursue a recommendation. In other situations, the set of alerts spawn events that cause the system to initiate some action or actions. For example, a system action might cause system parameters to be modified so as to enhance performance. Strictly as examples, such an event might cause a quota to be adjusted, or to cause reduction in the number of background tasks that are permitted to run concurrently, or to provision additional resources. In some cases, adjustments are proactively applied based on predicted future system behaviors.

As earlier mentioned, hyperconverged distributed systems with as many as several thousands of autonomous VMs per cluster can be highly dynamic. Further, such large scale, highly dynamic distributed systems can have numerous users that are independent or associated to each other in some way (e.g., in an enterprise). By continually receiving information (e.g., user specified performance indicators 103, system measurements 105, etc.) pertaining to the hyperconverged distributed system, the herein disclosed techniques can facilitate a dynamic threshold adjustment (operation 140), which dynamic threshold adjustment can serve to accurately represent user performance sentiment using the available set of system metrics. One embodiment of a setting comprising such a highly dynamic hyperconverged distributed system infrastructure is shown and described as pertains to FIG. 2.

FIG. 2 depicts a setting 200 in which embodiments of the present disclosure can operate. As an option, one or more variations of setting 200 or any aspect thereof may be implemented in the context of the architecture and functionality of the embodiments described herein. The setting 200 or any aspect thereof may be implemented in any environment.

The setting 200 shows various components associated with one instance of a hyperconverged distributed system comprising a distributed storage system 204 that can be used to implement the herein disclosed techniques. Specifically, the setting 200 can comprise multiple nodes (e.g., node $230_1$, ..., node $230_M$) that have multiple tiers of storage in a storage pool 270. For example, each node can be associated with one server, multiple servers, or portions of a server. A group of such nodes can be called a cluster. The multiple tiers of storage can include storage that is accessible through the network 214, such as a networked storage 275 (e.g., a storage area network or SAN, network attached storage or NAS, etc.). The storage pool 270 can also comprise one or more instances of local storage (e.g., local storage $272_1$, ..., local storage $272_M$) that is within or directly attached to a server and/or appliance associated with the nodes. Such local storage can include solid state drives (SSD $273_1$, ..., SSD $273_M$), hard disk drives (HDD $274_1$, ..., HDD $274_M$), and/or other storage devices.

Each node can implement at least one instance of a virtualized controller (e.g., virtualized controller $236_1$, ..., virtualized controller $236_M$) to facilitate access to the storage pool 270 by one or more user virtual machines (e.g., user VM $224_{11}$, ..., user VM $224_{1N}$, ..., user VM $224_{M1}$, ..., user VM $224_{MN}$) operated by users 122. The hardware of the node can be emulated for the user VMs by various hypervisors. For example, such hypervisors can be implemented using virtualization software (e.g., VMware ESXi, Microsoft Hyper-V, RedHat KVM, Nutanix AHV, etc.) that includes a hypervisor. Multiple instances of such virtualized controllers can coordinate within a cluster to form the distributed storage system 204 which can, among other operations, manage the storage pool 270. This architecture further facilitates efficient scaling of the distributed computing and/or storage platform (e.g., see scale 282). As earlier described, the user VMs can run certain client software such as applications (e.g., VM applications) that might interact with the virtualized controllers to access data in the storage pool 270. Any of the nodes can also facilitate application containers (e.g., application container $222_{1K}$, ..., application container $222_{MK}$) implemented in an operating system virtualization environment. Such application containers can interact with the virtualized controllers to access data in the storage pool 270.

The foregoing virtualized controllers can be implemented in setting 200 using various techniques. Specifically, containers (e.g., Docker containers) can be used to implement a virtualized controller at the node. In this case, the user VMs can access the storage pool 270 by interfacing with a controller container through a hypervisor and/or the kernel of the node host operating system. As another virtualized controller implementation example, an instance of a virtual machine at a given node can be used as a virtualized controller to manage storage and I/O activities. In this case, the user VMs at the node can interface with a controller virtual machine (e.g., controller VM) through a hypervisor to access the storage pool 270. In such cases, the controller VMs are not formed as part of specific implementations of the hypervisors. Instead, the controller VMs can run as virtual machines above the hypervisors on the various servers. When the controller VMs run above the hypervisors, varying virtual machine architectures and/or hypervisors can operate with the distributed storage system 204. For example, a hypervisor at one node in the distributed storage system 204 might correspond to VMware ESXi software, and a hypervisor at another node in the distributed storage system 204 might correspond to Nutanix AHV software.

In certain embodiments, one or more instances of a threshold adjustment agent can be implemented in the distributed storage system 204 to facilitate the herein disclosed techniques. Specifically, threshold adjustment agent $130_1$ can be implemented in the virtualized controller $236_1$, and threshold adjustment agent $130_M$ can be implemented in the virtualized controller $236_M$. Instances of the threshold adjustment agents (e.g., threshold adjustment agent $130_1$, threshold adjustment agent $130_M$) and/or instances of the shown system performance monitors (e.g., system monitor $132_1$, system monitor $132_M$) can be implemented in any nodes in any clusters.

As earlier described, the herein disclosed techniques can use a learning model to characterize various relationships between user specified performance indicators and system measurements to, for example, generate a mapping function. Further details pertaining to such techniques are described in FIG. 3A, FIG. 3B, and FIG. 3C.

Figure 3A:
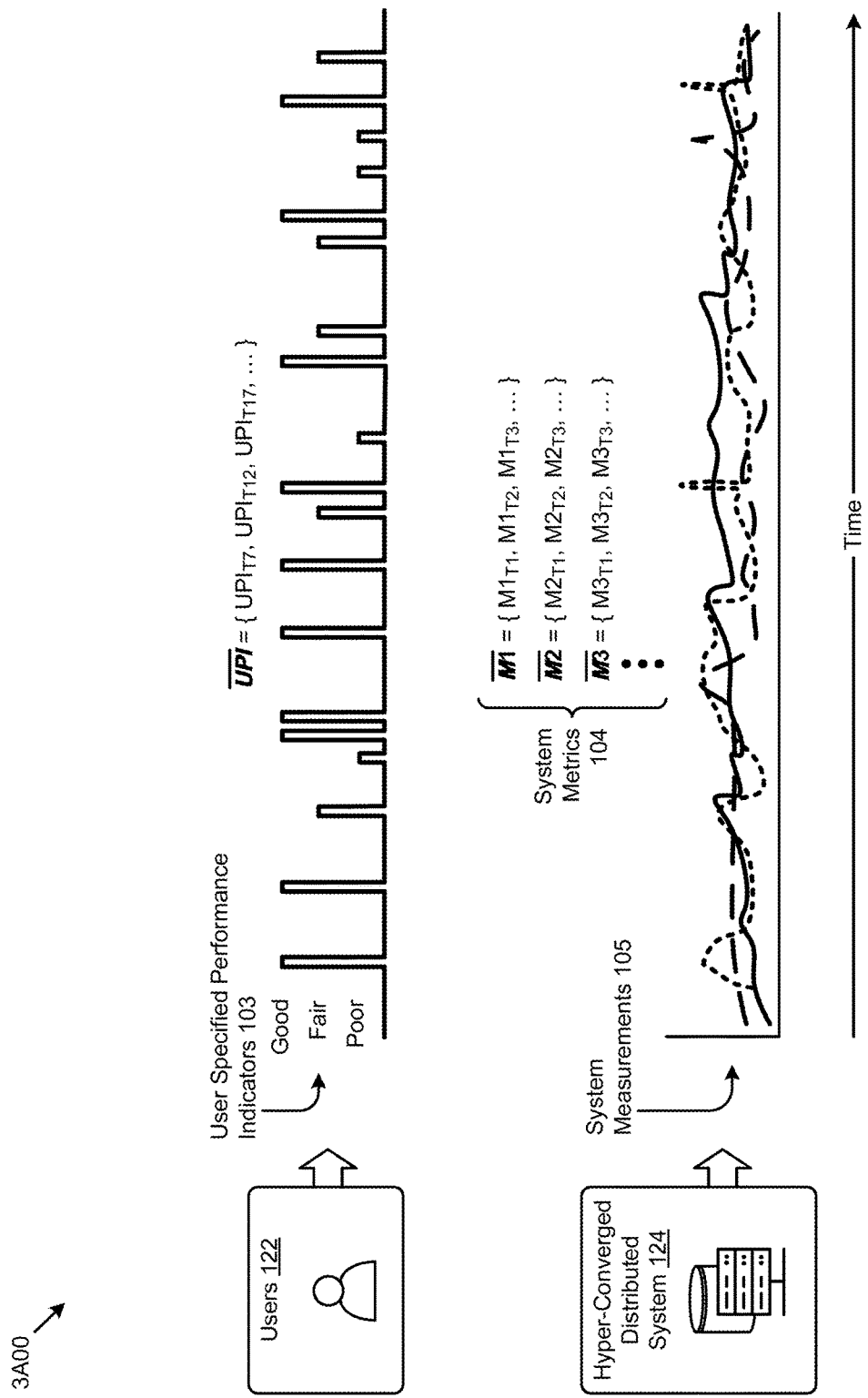
FIG. 3A presents a diagram that illustrates user specified performance indicator signals and system measurement signals in a hyperconverged distributed system.

FIG. 3A presents a diagram 3A00 that illustrates user specified performance indicator signals and system metric signals in a hyperconverged distributed system. As an option, one or more variations of diagram 3A00 or any aspect thereof may be implemented in the context of the architecture and functionality of the embodiments described herein. The diagram 3A00 or any aspect thereof may be implemented in any environment.

The diagram 3A00 illustrates a time-series visualization of a representative sample of various user specified performance indicators from users 122 and measured system metrics associated with hyperconverged distributed system 124. Specifically shown are time varying signals corresponding to user specified performance indicators 103 and system measurements 105 corresponding to various metrics from system metrics 104. The performance indicators and metric measurements shown in FIG. 3A and discussed herein can be formed as a sequential time-series (e.g., sequences) of data items (e.g., attributes, values, timestamps) representing various performance indicators instances and various metric measurement instances, respectively. For example, the signal pulses associated with user specified performance indicators 103 can represent certain times and levels (e.g., good, fair, poor) of the user performance sentiment input. When the time interval between data items is short (e.g., seconds or minutes) for a given sequence (e.g., system measurements 105), a visualization plot of the sequence can appear as a continuous signal.

For notational convenience, the temporal performance indicator and metric measurement signals can be represented as vectors, such as the user specified performance indicator vector $\overline{UPI}$ corresponding to indicators received from users over time, and the metric measurement vectors $\overline{M1}$, $\overline{M2}$, and $\overline{M3}$ corresponding to the metric measurements over time for a representative set of metrics. As an example, metric measurement vectors $\overline{M1}$, $\overline{M2}$, and $\overline{M3}$ might represent metrics associated with CPU utilization, storage consumption, and storage I/O activity, respectively. As another example, metric measurement vectors $\overline{M1}$, $\overline{M2}$, and $\overline{M3}$ might represent a single metric (e.g., CPU utilization) at various nodes (e.g., node1, node2, and node3, respectively). As shown, system measurements 105, when aggregated, can comprise a noisy signal, presenting a challenge to identifying respective correlations between performance indicators and system metrics. In such cases, the technological solution provided by the herein disclosed techniques can be implemented to discover such correlations as shown and described as pertaining to FIG. 3B.

Figure 3B:
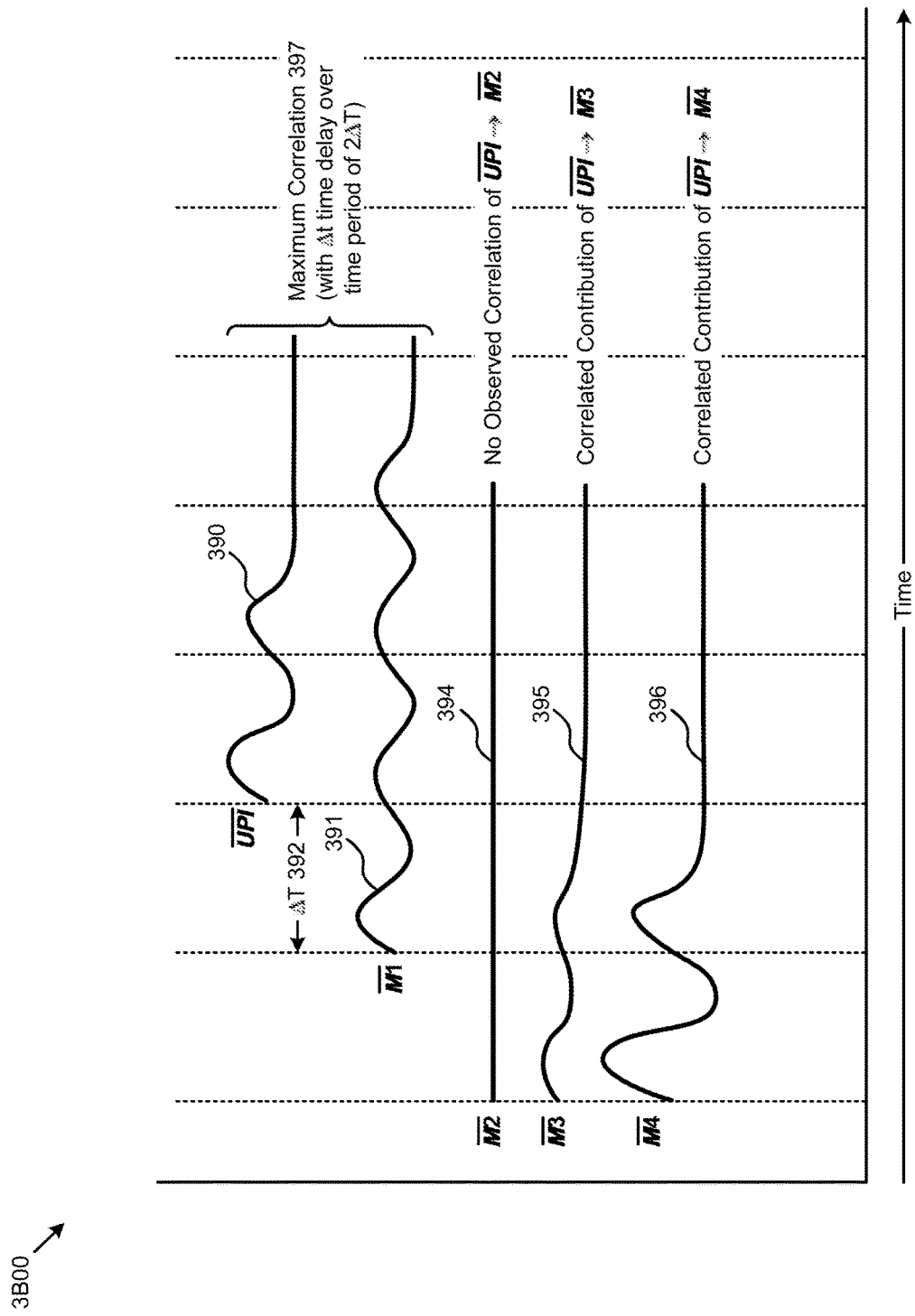
FIG. 3B presents a correlation chart showing time-based and value-based correlation techniques used in systems for dynamically setting system metric thresholds based on user specified performance feedback, according to some embodiments.

FIG. 3B presents a correlation chart 3B00 showing time-based and value-based correlation techniques used in systems for dynamically setting system metric thresholds based on user specified performance feedback. As an option, one or more variations of correlation chart 3B00 or any aspect thereof may be implemented in the context of the architecture and functionality of the embodiments described herein. The correlation chart 3B00 or any aspect thereof may be implemented in any environment.

User specified performance indicators (e.g., $\overline{UPI}$) in a hyperconverged distributed system might have an association with measurements of a certain metric (e.g., $\overline{M1}$). Additionally, $\overline{UPI}$ might have an association with one or more other metrics (e.g., $\overline{M3}$). In some situations measurements may exhibit a lack of an association with any metric in the system such as metric $\overline{M2}$ (e.g., when a sentiment changes even though it is deemed to be not correlated to a metric). Such correlations or lack of correlations can be automatically detected, and a scalar value representing the extent of correlation can be determined mathematically from any pair of vectors. In the discussions just below, the correlation of a time-series system measurement vector is considered with respect to a time-series performance indicator vector. In some cases (e.g., noisy system measurement signals with multiple performance indicator signals), the correlation between performance indicators and system measurements can be one-to-one, one-to-many, or many-to-one. Correlations can be positive (e.g., the time-series data moves in the same direction), or negative (e.g., the time-series data moves in the opposite direction), or zero (e.g., no correlation). Those skilled in the art will recognize there are many known-in-the-art techniques to correlate any pair of curves. For example, correlation can be based on a spatial distance and/or a temporal distance between data item attributes characterizing a performance indicator sequence and a system measurement sequence.

As shown, vector $\overline{UPI}$ is comprised of a series of changing values (e.g., depicted by the regression-fitted function resulting in curve 390). The vector $\overline{M1}$ is shown as curve 391. As can be appreciated, while curve 391 is not identical to curve 390 (e.g., curve 391 has undulations in the tail), curve 391 is substantially value-correlated to curve 390. Maximum value correlation 397 occurs when curve 391 is time-shifted by a $\Delta T$ 392 amount of time relative to curve 390 (see the $\Delta T$ 392 graduations on the time scale) and a time period of $2\Delta T$ is considered. For example, the $\Delta T$ 392 might represent a delay in the performance sentiment responsive to a certain variation in a system metric (e.g., a later change from good to fair performance sentiment after an earlier increase in storage I/O activity). The amount of correlation and amount of time shift can be automatically determined. Various examples of cross-channel correlations are presented in Table 1 and in FIG. 3B.

TABLE 1

Cross-correlation examples

| Performance indicator → System measurement | Description |
|---|---|
| $\overline{UPI} \rightarrow \overline{M2}$ (curve 394) | No correlation |
| $\overline{UPI} \rightarrow \overline{M3}$ (curve 395) | Correlates if time is shifted and attenuated |
| $\overline{UPI} \rightarrow \overline{M4}$ (curve 396) | Correlates if time is shifted and amplified |

In some cases, a correlation calculation can identify a negative correlation where an increase in a certain system measurement (e.g., storage I/O activity) causes a decrease in a performance indicator (e.g., poor speed performance). Further, in some cases, a correlation calculation can identify an inverse correlation where a large increase in a certain system measurement causes a small increase in a performance indicator. In still further cases, there can be no observed correlation (e.g., see curve 394). Specifically, as shown, there is no correlation to the time-series $\overline{M2}$. The curve 395 is substantially value-correlated (e.g., though scaled down) to curve 390, and is time-shifted by a second $\Delta T$ amount of time relative to curve 390. The curve 396 is substantially value-correlated (e.g., though scaled up) to curve 390, and is time-shifted by a second $\Delta T$ amount of time relative to curve 390.

In some cases, a correlation calculation can hypothesize one or more causation effects. In some cases, correlation conditions are considered when calculating correlation such that a priori known conditions can be included (or excluded) from the correlation calculations.

In some cases, correlation parameters are provided to handle specific correlation cases. In one case, the correlation between two time-series can be determined to a scalar value r (e.g., using known-in-the art calculations such as Pearson's product-moment coefficient).

Other correlation techniques are possible, and a system manager might provide an indicator and parameters associated with such alternative correlations. In some cases, while modeling a time-series, not all the scalar values in the time-series are weighted equally. For example, more recent time-series data values found in the historical data can be given a higher weight as compared to older ones. Various shapes of weights to overlay a time-series are possible, and one exemplary shape is the shape of an exponentially decaying model.

In certain embodiments, the foregoing correlation techniques can be implemented by the herein disclosed techniques to generate a mapping function used in systems for dynamically setting system metric thresholds based on user specified performance feedback. One such mapping function generation technique is shown and described as pertaining to FIG. 3C.

Figure 3C:
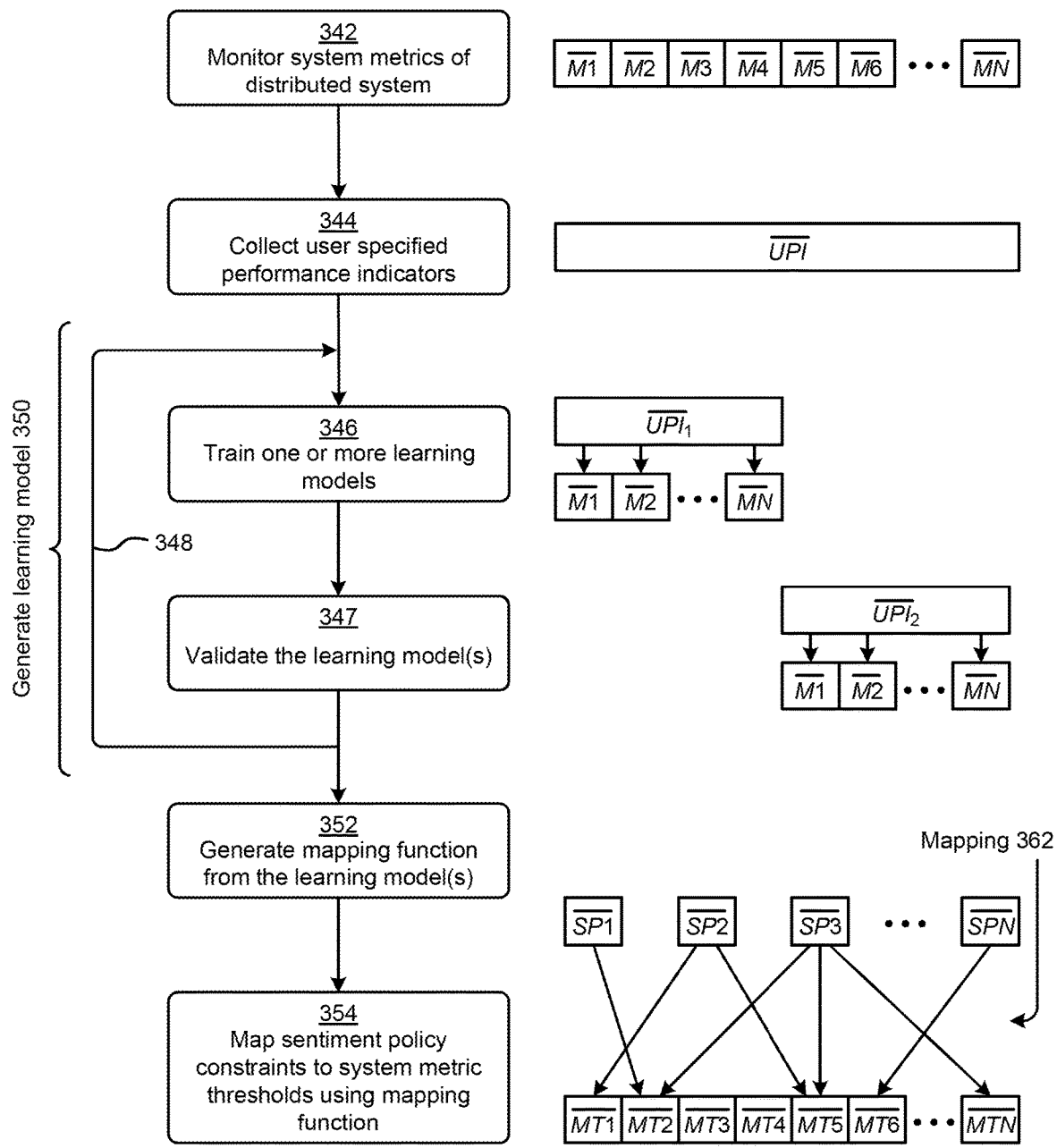
FIG. 3C presents a mapping function generation technique as used in systems for dynamically setting system metric thresholds based on user specified performance feedback, according to some embodiments.

FIG. 3C presents a mapping function generation technique 3C00 as used in systems for dynamically setting system metric thresholds based on user specified performance feedback. As an option, one or more variations of mapping function generation technique 3C00 or any aspect thereof may be implemented in the context of the architecture and functionality of the embodiments described herein. The mapping function generation technique 3C00 or any aspect thereof may be implemented in any environment.

The mapping function generation technique 3C00 depicts certain operations for generating a mapping function and/or other parameters based at least in part on one or more learning models (see grouping 350) that can be used by the herein disclosed techniques. As shown, a subject distributed system can be monitored by collecting measurements of certain system metrics characterizing the behavior of the system (at step 342). Various sets of user specified performance indicators can also be collected (at step 344). For example, and as shown, various time-series vectors corresponding to system measurements (e.g., $\overline{M1}, \overline{M2}, \ldots, \overline{MN}$) and user specified performance indicators (e.g., $\overline{UPI}$) might be collected. In some cases, user specified performance indicators corresponding to various sentiment categories (e.g., speed, availability, response, etc.) can be combined and/or separated by category.

A portion of the collected performance indicator data (e.g., $\overline{UPI_1}$) can be used to train one or more learning models (at step 346). A different portion of the collected performance indicator data (e.g., $\overline{UPI_2}$) can be used to validate the learning models (at step 347). The processes of training and/or validating can be iterated (by path 348) until the learning models behave within target tolerances (e.g., with respect to predictive statistic metrics, descriptive statistics, significance tests, etc.). In some cases, additional data (e.g., historical data) can be collected to further train and/or validate the learning models. When the learning models have been generated, a mapping function 142 comprising a set of parameters (e.g., input variables, output variables, equations, equation coefficients, mapping relationships, limits, constraints, etc.) derived from the learning models can be generated (at step 352) and correlations can commence. Strictly as one example, the learning model can correlate a series of sentiments to a particular user. Further, if a particular user is found to have a higher correlation to a particular (e.g., negative) sentiment as compared to other users, then that user's sentiments might be biased (e.g., discounted) so as to normalize to the user base as a whole.

Mapping Function

According to the herein disclosed techniques, the mapping function can be used to map (e.g., see mapping 362) sentiment policy constraints (e.g., $\overline{SP1}, \overline{SP2}, \ldots, \overline{SPN}$) to system metric thresholds (e.g., $\overline{MT1}, \overline{MT2}, \ldots, \overline{MTN}$) (at step 354). More particularly, mathematically-derived correlations between individual members of a set of sentiment policy constraints and individual members of system metric thresholds can be quantified such as by a correlation coefficient and/or by a correlation polarity). When there is a correlation coefficient that exceeds a particular quantity (e.g., indicating a strong correlation), then the mapping function can generate a mapping indication (e.g., an edge in a graph) to indicate the determination of a strong correlation between the sentiment and a system metric threshold. In some cases correlations and respective mappings might pertain to ranges of performance rather than merely at particular threshold point. For example, if the user indicates a "Poor" sentiment whenever the CPU headroom (e.g., where headroom=the quantity 100% minus CPU utilization percent) is any value less than 10%, then a mapping can be made that codifies "Poor" sentiment across the range of CPU utilization from 0% to 90%.

The aforementioned mapping function can be used with the herein disclosed techniques by various users associated with hyperconverged distributed systems, which users include system administrators, system providers, enterprise users, and/or other users. One embodiment of a use model for such users is shown and described as pertaining to FIG. 4.

Figure 4:
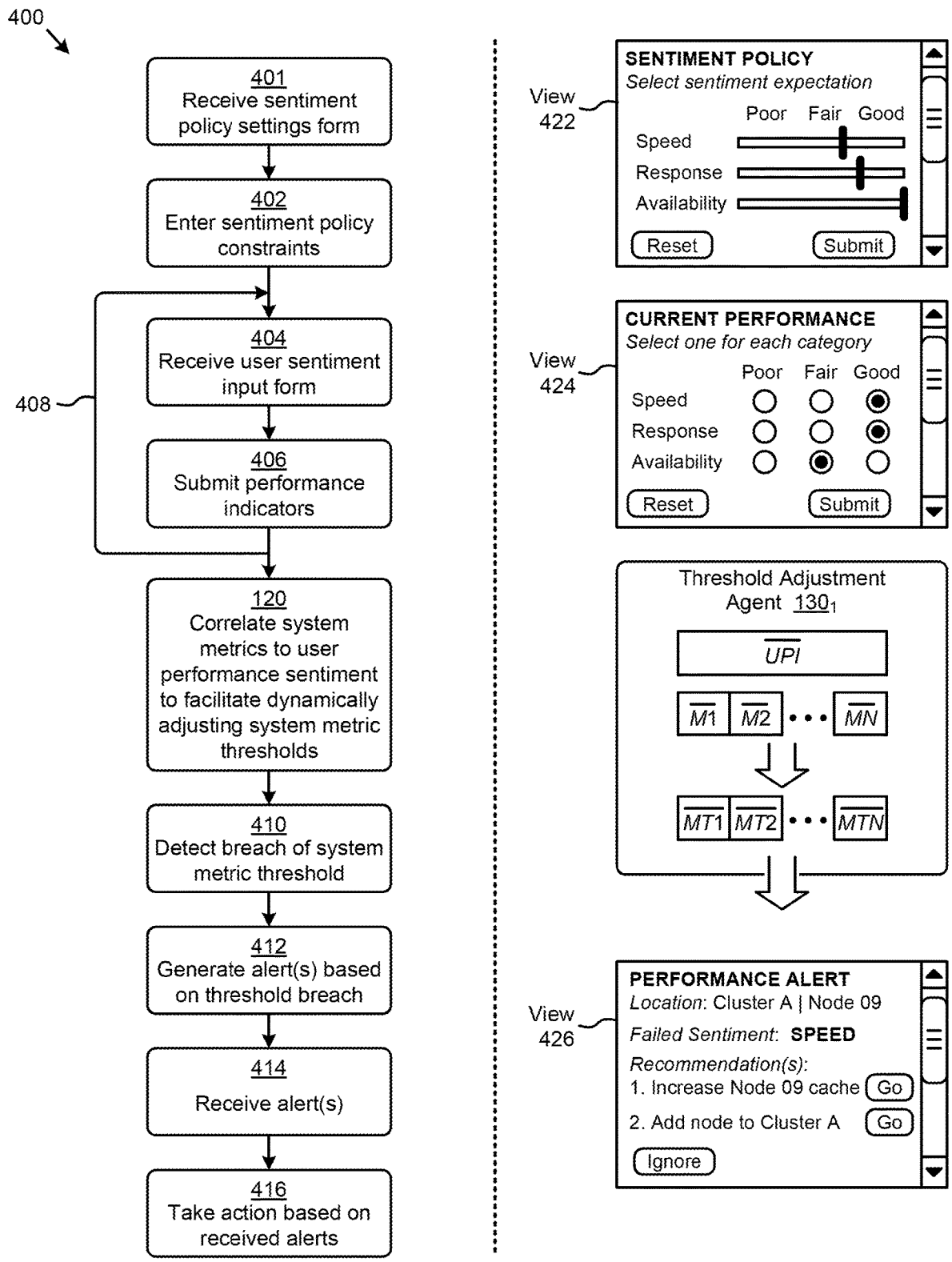
FIG. 4 depicts a diagrammatic representation of a use model for systems that dynamically adjust system metric thresholds based on user specified performance feedback, according to some embodiments.

FIG. 4 depicts a diagrammatic representation 400 of a use model for systems that dynamically adjust system metric thresholds based on user specified performance feedback. As an option, one or more variations of diagrammatic representation 400 or any aspect thereof may be implemented in the context of the architecture and functionality of the embodiments described herein. The diagrammatic representation 400 or any aspect thereof may be implemented in any environment.

FIG. 4 presents one embodiment of certain steps and/or operations for facilitating dynamic adjustment of system metric thresholds based on user specified performance feedback, according to the herein disclosed techniques. In one or more embodiments, the steps and underlying operations shown in FIG. 4 can be facilitated at least in part by an instance of the threshold adjustment agent $130_1$ earlier shown and described as pertaining to FIG. 1B. As shown, the use model can commence with a user receiving a sentiment policy settings form (at step 401). The sentiment policy settings form might be a web form and/or other user interface comprising interactive components (e.g., sliders, text boxes, radial buttons, dropdown selectors, etc.). For example, as shown in view 422, a user might be able to enter sentiment policy constraints (e.g., non-compliance boundaries) for various performance categories, such as speed, response, and availability (at step 402).

The user might further receive a user sentiment input form at various moments in time (at step 404). For example, as shown in view 424, a user might be able to submit user specified performance indicators (e.g., poor, fair, good, etc.) for various performance categories, such as speed, response, and availability (at step 406). Various instances of the user sentiment input form can be presented to the users at multiple moments in times (via path 408) based at least in part on a time period, or a system event (e.g., threshold breach).

Based on the foregoing information collected from the user and/or other information, the herein disclosed techniques can correlate system metrics to user performance sentiment to facilitate dynamically adjusting system metric thresholds (at operation 120). For example, as shown, threshold adjustment agent $130_1$ can use the herein disclosed techniques to generate a set of system metric thresholds (e.g., $\overline{MT1}, \overline{MT2}, \ldots, \overline{MTN}$) based at least in part on a set of user specified performance indicators (e.g., $\overline{UPI}$) and a set of system measurements (e.g., $\overline{M1}, \overline{M2}, \ldots, \overline{MN}$). Certain threshold breaches of any of the system metric thresholds can be detected (at step 410). Such threshold breaches can be used to trigger one or more alerts (at step 412). In some cases, one threshold breach can trigger a given alert. In other cases, a logical combination of two or more threshold breaches can trigger an alert. When the alerts are received by one or more of the users (at step 414), certain actions can be taken (at step 416). For example, as shown in view 426, an alert might indicate the failed sentiment (e.g., "SPEED") and recommend certain actions. Such recommended actions can be derived from the herein disclosed techniques such that the actions can have a high probability of addressing the failed sentiment. In the example shown, the user can accept (e.g., click "Go") one or both of the recommended actions (e.g., increase Node 09 cache or add node to Cluster A), or ignore the recommendations.

Additional Embodiments of the Disclosure

Additional Practical Application Examples

Figure 5:
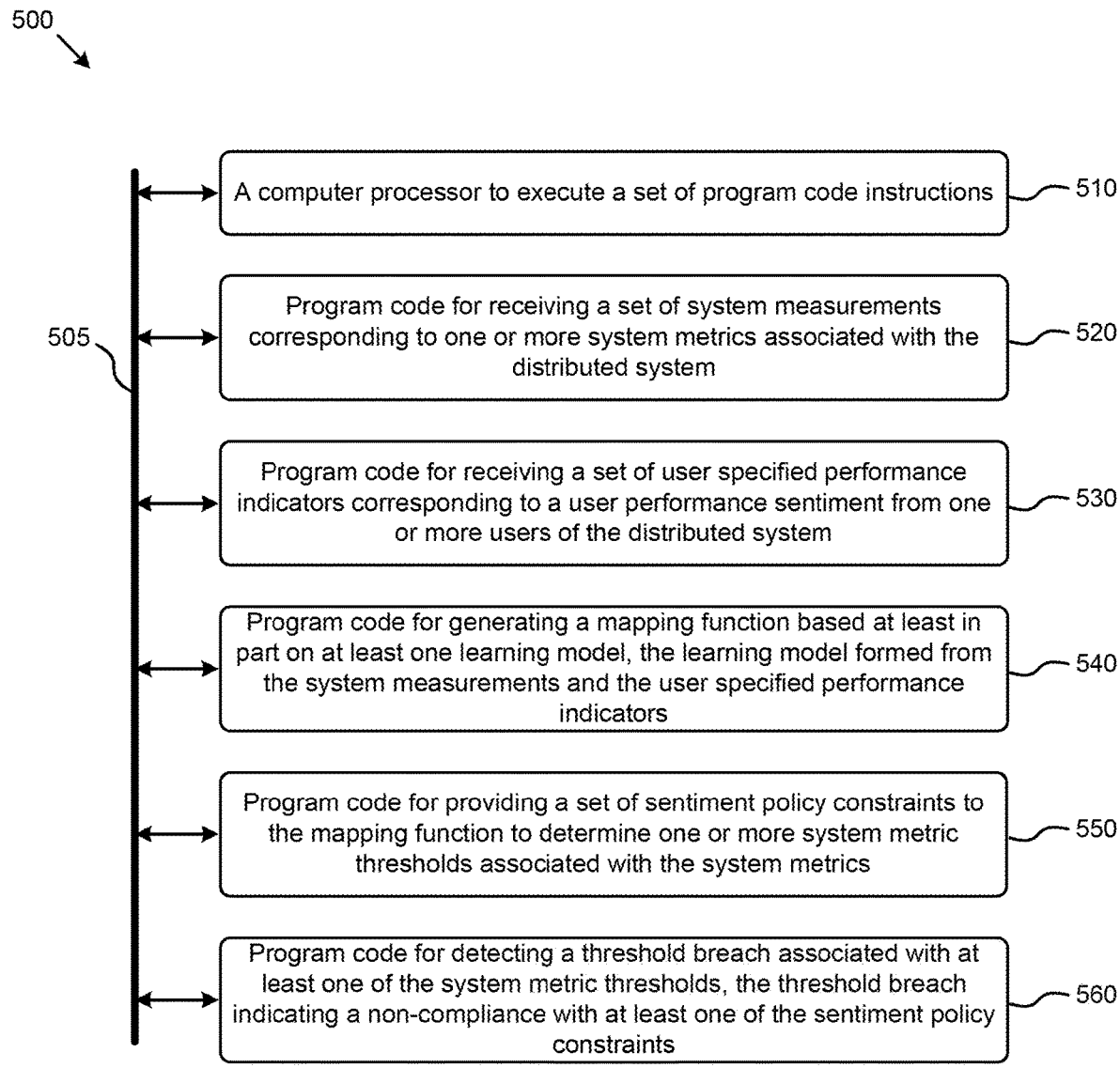
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The shown embodiment implements a portion of a computer system, presented as system 500, comprising a computer processor to execute a set of program code instructions (module 510) and modules for accessing memory to hold program code instructions to perform: receiving a set of system measurements corresponding to one or more system metrics associated with the distributed system (module 520); receiving a set of user specified performance indicators corresponding to a user performance sentiment from one or more users of the distributed system (module 530); generating a mapping function based at least in part on at least one learning model, the learning model formed from the system measurements and the user specified performance indicators (module 540); exposing a set of sentiment policy constraints to the mapping function to determine one or more system metric thresholds associated with the system metrics (module 550); and detecting a threshold breach associated with at least one of the system metric thresholds, the threshold breach indicating a non-compliance with at least one of the sentiment policy constraints (module 560).

Variations of the foregoing may include more or fewer of the shown modules and variations may perform more or fewer (or different) steps, and/or may use data elements in more, or in fewer (or different) operations.

Some embodiments include variations where the system metric thresholds are determined based at least in part on a mapping of the sentiment policy constraints to the system metric thresholds, the mapping based at least in part on the mapping function.

Some embodiments include variations that comprise steps for generating at least one alert responsive to detecting the threshold breach.

Some embodiments include variations that comprise steps for issuing a user sentiment input form to facilitate receiving the user sentiment indications.

Some embodiments include variations that comprise presenting a user sentiment input form to facilitate receiving the user specified performance indicators.

Some embodiments include variations where the user sentiment input form is presented based at least in part on one of, a time period, a system event, or the threshold breach.

Some embodiments include variations that comprise presenting a sentiment policy settings form to collect the sentiment policy constraints.

Some embodiments include variations that comprise steps for determining one or more recommended actions based at least in part on the threshold breach.

Some embodiments include variations where the user specified performance indicators are associated with one or more sentiment categories.

Some embodiments include variations where the system metrics characterize at least one of, a CPU utilization, a storage access latency, a storage consumption, a bandwidth consumption, a storage contention, or a storage I/O activity.

System Architecture Overview

Additional System Architecture Examples

Figure 6A:
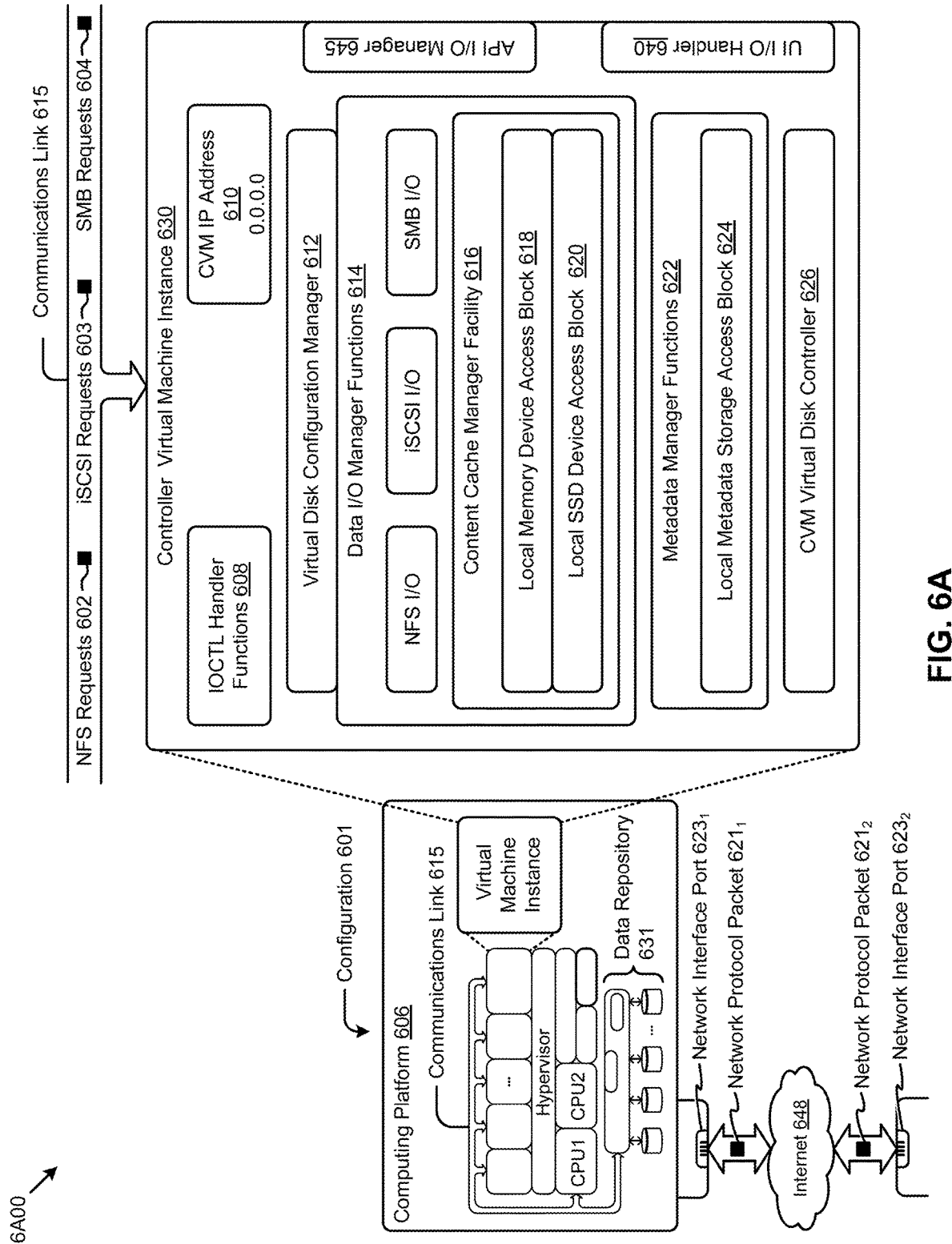
FIG. 6A and FIG. 6B depict virtualized controller architectures comprising collections of interconnected components suitable for implementing embodiments of the present disclosure and/or for use in the herein-described environments.

FIG. 6A depicts a virtualized controller as implemented by the shown virtual machine architecture 6A00. The virtual machine architecture comprises a collection of interconnected components suitable for implementing embodiments of the present disclosure and/or for use in the herein-described environments. Moreover, the shown virtual machine architecture 6A00 includes a virtual machine instance in a configuration 601 that is further described as pertaining to the controller virtual machine instance 630. A controller virtual machine instance receives block I/O (input/output or IO) storage requests as network file system (NFS) requests in the form of NFS requests 602, and/or internet small computer storage interface (iSCSI) block IO requests in the form of iSCSI requests 603, and/or Samba file system (SMB) requests in the form of SMB requests 604. The controller virtual machine (CVM) instance publishes and responds to an internet protocol (IP) address (e.g., see CVM IP address 610). Various forms of input and output (I/O or IO) can be handled by one or more IO control handler functions (see IOCTL functions 608) that interface to other functions such as data IO manager functions 614 and/or metadata manager functions 622. As shown, the data IO manager functions can include communication with a virtual disk configuration manager 612 and/or can include direct or indirect communication with any of various block IO functions (e.g., NFS IO, iSCSI IO, SMB IO, etc.).

In addition to block IO functions, the configuration 601 supports IO of any form (e.g., block IO, streaming IO, packet-based IO, HTTP traffic, etc.) through either or both of a user interface (UI) handler such as UI IO handler 640 and/or through any of a range of application programming interfaces (APIs), possibly through the shown API IO manager 645.

The communications link 615 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 630 includes a content cache manager facility 616 that accesses storage locations, possibly including local dynamic random access memory (DRAM) (e.g., through the local memory device access block 618) and/or possibly including accesses to local solid state storage (e.g., through local SSD device access block 620).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 631, which in turn can be formatted into any one or more storage areas, and which can comprise parameterized storage accessible by a key (e.g., a filename, a table name, a block address, an offset address, etc.). An external data repository 631 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 624. The external data repository 631 can be configured using a CVM virtual disk controller 626, which can in turn manage any number or any configuration of virtual disks.

Execution of the sequences of instructions to practice certain embodiments of the disclosure are performed by one or more instances of a processing element such as a data processor, or such as a central processing unit (e.g., CPU1, CPU2). According to certain embodiments of the disclosure, two or more instances of a configuration 601 can be coupled by a communications link 615 (e.g., backplane, LAN, PTSN, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port $623_1$ and network interface port $623_2$). The configuration 601 can be addressed through one or more network interface ports using an IP address. Any operational element within computing platform 606 can perform sending and receiving operations using any of a range of network protocols, possibly including network protocols that send and receive packets (e.g., see network protocol packet 621 and network protocol packet $621_2$).

The computing platform 606 may transmit and receive messages that can be composed of configuration data, and/or any other forms of data and/or instructions organized into a data structure (e.g., communications packets). In some cases, the data structure includes program code instructions (e.g., application code) communicated through Internet 648 and/or through any one or more instances of communications link 615. Received program code may be processed and/or executed by a CPU as it is received and/or program code may be stored in any volatile or non-volatile storage for later execution. Program code can be transmitted via an upload (e.g., an upload from an access device over the Internet 648 to computing platform 606). Further, program code and/or results of executing program code can be delivered to a particular user via a download (e.g., a download from the computing platform 606 over the Internet 648 to an access device).

The configuration 601 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics pertaining to dynamically setting system metric thresholds based on user specified performance feedback.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects pertaining to dynamically setting system metric thresholds based on user specified performance feedback). Such files or records can be brought into and/or stored in volatile or non-volatile memory.

Figure 6B:
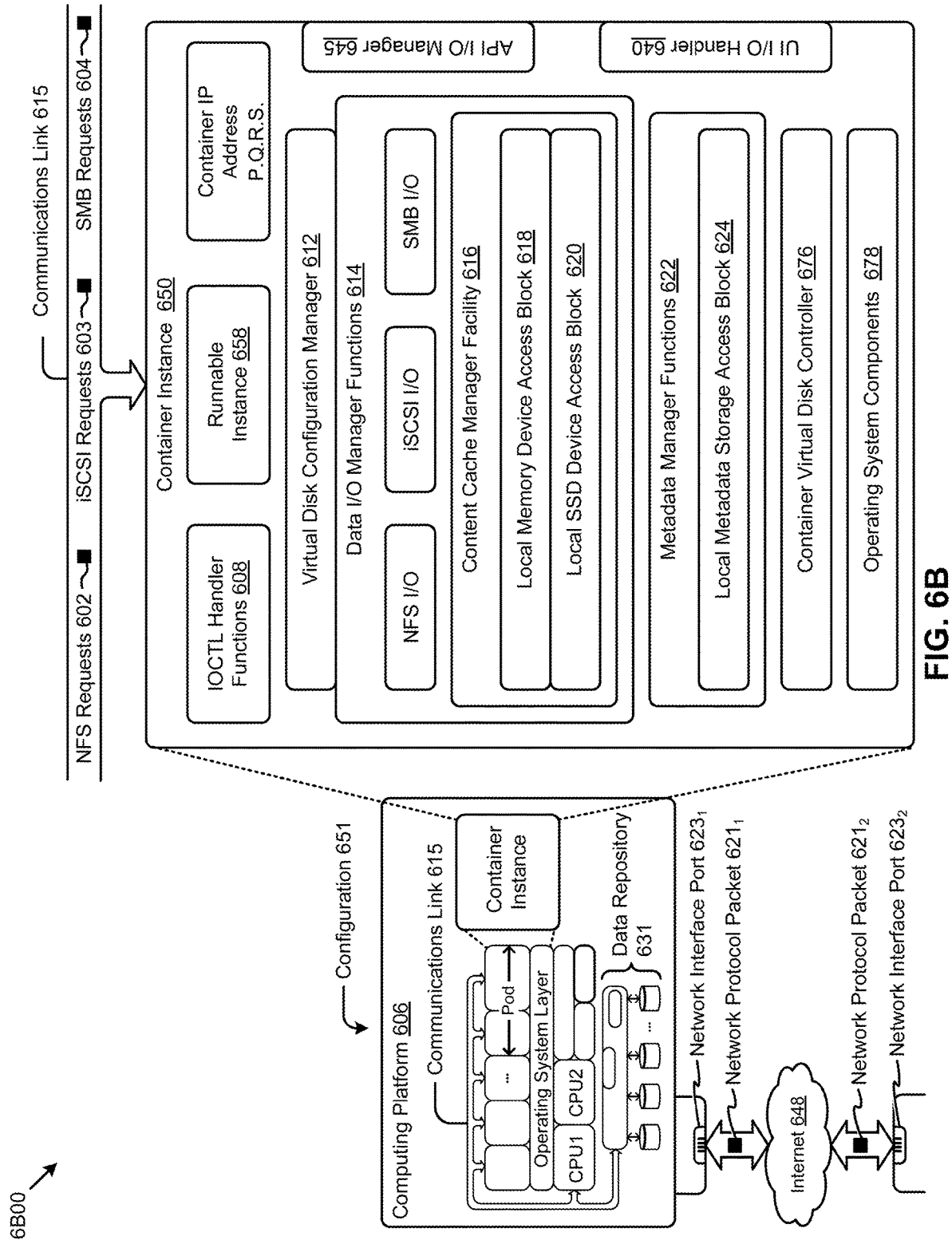

FIG. 6B depicts a virtualized controller implemented by a containerized architecture 6B00. The containerized architecture comprises a collection of interconnected components suitable for implementing embodiments of the present disclosure and/or for use in the herein-described environments. Moreover, the shown containerized architecture 6B00 includes a container instance in a configuration 651 that is further described as pertaining to the container instance 650. The configuration 651 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 650). A container instance can be executed by a processor. Runnable portions of a container instance sometimes derive from a container image, which in turn might include all, or portions of any of, a Java archive repository (JAR) and/or its contents, a script or scripts and/or a directory of scripts, a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls -a", etc.). The container might optionally include operating system components 678, however such a separate set of operating system components need not be provided. As an alternative, a container can include a runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 676. Such a container virtual disk controller can perform any of the functions that the aforementioned CVM virtual disk controller 626 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   receiving a system measurement corresponding to a system metric associated with a computing system;
   receiving a user sentiment indication that corresponds to a user performance sentiment;
   detecting, by the computing system, a system metric threshold breach event wherein a detected threshold breach value breaches a respective system metric threshold;
   accessing a learning model comprising user sentiment correlations between system measurements and user sentiment indications to determine a tracking value between the user sentiment indication and the system metric pertaining to the system metric threshold; and
   adjusting the respective system metric threshold based on the tracking value.

2. The method of claim 1, wherein the user sentiment indications are received via a user interface.

3. The method of claim 1, further comprising generating an alert responsive to detecting the threshold breach.

4. The method of claim 1, further comprising suppressing an alert responsive to an adjusted threshold.

5. The method of claim 1, further comprising presenting a user sentiment input form to facilitate receiving the user sentiment indications.

6. The method of claim 5, wherein the user sentiment input form is presented based at least in part on one of, a time period, a system event, or the threshold breach.

7. The method of claim 1, further comprising determining a need for adjustment of sentiment when user sentiment indications do not track performance.

8. The method of claim 1, further comprising determining one or more recommended actions based at least in part on the threshold breach.

9. The method of claim 1, wherein the system metrics characterize at least one of, a CPU utilization, a storage access latency, a storage consumption, a bandwidth consumption, a storage contention, or a storage I/O activity.

10. A computer readable medium, embodied in a non-transitory computer readable medium, the non-transitory computer readable medium having stored thereon instructions which, when stored in memory and executed by a processor causes the processor to perform operations comprising:
    receiving a system measurement corresponding to a system metric associated with a computing system;
    receiving a user sentiment indication that corresponds to a user performance sentiment;
    generating a learning model, the learning model comprising user sentiment correlations between the system measurements and the user sentiment indications;
    detecting, by the computing system, a system metric threshold breach event wherein a detected threshold breach value breaches a respective system metric threshold;
    accessing a learning model comprising user sentiment correlations between system measurements and user sentiment indications to determine a tracking value between the user sentiment indication and the system metric pertaining to the system metric threshold; and
    adjusting the respective system metric threshold based on the tracking value.

11. The computer readable medium of claim 10, further comprising determining whether the user sentiment indications track identified alerts.

12. The computer readable medium of claim 10, further comprising instructions which, when stored in memory and executed by the processor causes the processor to perform acts of generating an alert responsive to detecting the threshold breach.

13. The computer readable medium of claim 10, further comprising instructions which, when stored in memory and executed by the processor causes the processor to perform acts of suppressing an alert responsive to an adjusted threshold.

14. The computer readable medium of claim 10, further comprising instructions which, when stored in memory and executed by the processor causes the processor to perform acts of presenting a user sentiment input form to facilitate receiving the user sentiment indications.

15. The computer readable medium of claim 10, wherein the instructions further cause the processor to determine a need for adjustment of sentiment when user sentiment indications do not track performance.

16. The computer readable medium of claim 10, further comprising instructions which, when stored in memory and executed by the processor causes the processor to perform acts of presenting a sentiment policy settings form to collect a set of sentiment policy constraints.

17. The computer readable medium of claim 10, further comprising instructions which, when stored in memory and executed by the processor causes the processor to perform acts of determining one or more recommended actions based at least in part on the threshold breach.

18. The computer readable medium of claim 10, wherein the system metrics characterize at least one of, a CPU utilization, a storage access latency, a storage consumption, a bandwidth consumption, a storage contention, or a storage I/O activity.

19. A system comprising:
a storage medium having stored thereon a sequence of instructions; and
a processor that executes the instructions to cause the processor to perform operations comprising,
receiving a system measurement corresponding to a system metric associated with a computing system;
receiving a user sentiment indication that corresponds to a user performance sentiment;
detecting, by the computing system, a system metric threshold breach event wherein a detected threshold breach value breaches a respective system metric threshold;
accessing a learning model comprising user sentiment correlations between system measurements and user sentiment indications to determine a tracking value between the user sentiment indication and the system metric pertaining to the system metric threshold; and
adjusting the respective system metric threshold based on the tracking value.

20. The system of claim 19, further comprising determining a need for adjustment of sentiment when the user sentiment indications do not track performance.

21. The system of claim 19, wherein the operations further comprise suppressing an alert responsive to an adjusted threshold.

22. The system of claim 19, wherein the operations further comprise presenting a user sentiment input form to facilitate receiving the user sentiment indications.

23. The system of claim 22, wherein the user sentiment input form is presented based at least in part on one of, a time period, a system event, or the threshold breach.

24. The system of claim 19, wherein the operations further comprise presenting a sentiment policy settings form to collect a set of sentiment policy constraints.

25. The system of claim 19, wherein the operations further comprise determining a recommended action based at least in part on the threshold breach.

26. The system of claim 19, wherein the system metrics characterize at least one of, a CPU utilization, a storage access latency, a storage consumption, a bandwidth consumption, a storage contention, or a storage I/O activity.

* * * * *